US012190576B2

(12) United States Patent
Lee et al.

(10) Patent No.: US 12,190,576 B2
(45) Date of Patent: *Jan. 7, 2025

(54) ELECTRONIC DEVICE FOR PROVIDING SHOOTING MODE BASED ON VIRTUAL CHARACTER AND OPERATION METHOD THEREOF

(71) Applicant: Samsung Electronics Co., Ltd., Gyeonggi-do (KR)

(72) Inventors: Wooyong Lee, Gyeonggi-do (KR); Seunghyup Baik, Gyeonggi-do (KR); Chanmin Park, Gyeonggi-do (KR); Hyejin Kang, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,393

(22) Filed: Aug. 25, 2021

(65) Prior Publication Data

US 2021/0383119 A1 Dec. 9, 2021

Related U.S. Application Data

(63) Continuation of application No. 16/793,341, filed on Feb. 18, 2020, now Pat. No. 11,138,434.

(30) Foreign Application Priority Data

Feb. 19, 2019 (KR) .......................... 10-2019-0019526

(51) Int. Cl.
G06V 20/20 (2022.01)
G06T 13/40 (2011.01)
(Continued)

(52) U.S. Cl.
CPC .............. *G06V 20/20* (2022.01); *G06T 13/40* (2013.01); *G06V 20/64* (2022.01); *G06V 40/168* (2022.01)

(58) Field of Classification Search
CPC ........... G06K 9/00201; G06K 9/00268; G06K 9/00664; G06K 9/00677; G06K 9/00671; G06T 13/40
See application file for complete search history.

(56) References Cited

U.S. PATENT DOCUMENTS 8,867,786 B2 10/2014 Craig
9,413,967 B2 8/2016 Kim et al.
(Continued)

FOREIGN PATENT DOCUMENTS

CN 101957981 A 1/2011
CN 102004897 A 4/2011
(Continued)

OTHER PUBLICATIONS

Preliminary Opinion on the Oral Proceedings dated Nov. 7, 2022.
(Continued)

Primary Examiner — Abderrahim Merouan
(74) Attorney, Agent, or Firm — Cha & Reiter, LLC

(57) ABSTRACT

An electronic device according to an embodiment may include: a camera module; a display; and a processor, wherein the processor may be configured to: obtain a preview image corresponding to an external object using the camera module; determine attributes of the external object, based on the obtained preview image; synthesize the preview image with a virtual character image, based on the attributes of the external object; and output the synthesized preview image through the display. Other embodiments may be provided.

20 Claims, 10 Drawing Sheets

(51) Int. Cl.
*G06V 20/64* (2022.01)
*G06V 40/16* (2022.01)

(56) References Cited

U.S. PATENT DOCUMENTS

| | | | | |
|---|---|---|---|---|
| 10,270,983 | B1* | 4/2019 | Van Os | H04N 7/147 |
| 10,373,348 | B2* | 8/2019 | Sugaya | G06T 11/60 |
| 10,410,434 | B1* | 9/2019 | Scapel | G06T 13/80 |
| 10,521,948 | B2* | 12/2019 | Rickwald | G06V 40/171 |
| 10,528,243 | B2* | 1/2020 | Manzari | H04N 23/667 |
| 11,074,753 | B2* | 7/2021 | Barlier | G06T 19/20 |
| 11,443,460 | B2* | 9/2022 | Caballero | G06T 11/00 |
| 2008/0297617 | A1 | 12/2008 | Jeong | |
| 2009/0066817 | A1 | 3/2009 | Sakamaki | |
| 2010/0124941 | A1* | 5/2010 | Cho | H04M 1/72427 345/173 |
| 2010/0141784 | A1 | 6/2010 | Yoo | |
| 2011/0007086 | A1 | 1/2011 | Kim et al. | |
| 2011/0052081 | A1 | 3/2011 | Onoe et al. | |
| 2012/0079378 | A1* | 3/2012 | Goossens | G06T 17/10 715/849 |
| 2013/0100140 | A1* | 4/2013 | Ye | G06T 13/40 345/473 |
| 2014/0047389 | A1* | 2/2014 | Aarabi | G06F 3/0482 715/834 |
| 2014/0267867 | A1* | 9/2014 | Lee | H04N 9/74 348/333.01 |
| 2015/0033192 | A1* | 1/2015 | Bohannon | G06F 3/0304 715/863 |
| 2015/0237249 | A1 | 8/2015 | Sato et al. | |
| 2015/0277686 | A1* | 10/2015 | LaForge | G06Q 50/01 715/723 |
| 2015/0325029 | A1* | 11/2015 | Li | G06T 1/0007 382/103 |
| 2016/0086387 | A1 | 3/2016 | Os et al. | |
| 2016/0134840 | A1 | 5/2016 | McCulloch | |
| 2016/0163083 | A1 | 6/2016 | Barmpoutis | |
| 2016/0217601 | A1 | 7/2016 | Tsuda et al. | |
| 2017/0069124 | A1 | 3/2017 | Tong et al. | |
| 2017/0287060 | A1 | 10/2017 | Choi et al. | |
| 2018/0047200 | A1* | 2/2018 | O'Hara | G06V 10/242 |
| 2018/0182145 | A1 | 6/2018 | Imoto et al. | |
| 2018/0191962 | A1 | 7/2018 | Javier et al. | |
| 2018/0335929 | A1 | 11/2018 | Scapel et al. | |
| 2018/0335930 | A1 | 11/2018 | Scapel et al. | |
| 2018/0364799 | A1* | 12/2018 | Ord | A63F 13/5258 |
| 2019/0138096 | A1* | 5/2019 | Lee | G10L 25/51 |
| 2020/0302668 | A1* | 9/2020 | Guo | G06T 13/40 |

FOREIGN PATENT DOCUMENTS

| | | |
|---|---|---|
| EP | 1998556 A1 | 12/2009 |
| EP | 2293221 A2 | 3/2011 |
| EP | 3047884 A1 | 7/2016 |
| JP | 2015-156573 A | 8/2015 |
| KR | 10-2009-0074957 A | 7/2009 |
| WO | 2017/013925 A1 | 1/2017 |
| WO | 2018/213500 A1 | 11/2018 |

OTHER PUBLICATIONS

Decision to Refuse dated Dec. 5, 2022.
European Search Report dated Apr. 18, 2023.
Korean Office Action dated Aug. 22, 2023.
Chinese Office Action dated Dec. 11, 2023.
Chinese Office Action dated Jun. 21, 2024.
European Office Action dated Oct. 24, 2024.

* cited by examiner

ELECTRONIC DEVICE FOR PROVIDING SHOOTING MODE BASED ON VIRTUAL CHARACTER AND OPERATION METHOD THEREOF

CROSS-REFERENCE TO RELATED APPLICATION(S)

This application is a Continuation of U.S. patent application Ser. No. 16/793,341 filed on Feb. 18, 2020 which is based on and claims priority under 35 U.S.C. 119 to Korean Patent Application No. 10-2019-0019526, filed on Feb. 19, 2019, in the Korean Intellectual Property Office, the disclosure of which is herein incorporated by reference in its entirety.

BACKGROUND

1) Field

One or more embodiments of the instant disclosure generally relate to an electronic device that provides a virtual character-based shooting mode and an operation method thereof.

2) Description of Related Art

Recent developments in the electronic communication industry have brought about a proliferation of portable electronic devices. For example, portable electronic devices may include various portable electronic devices such as personal digital assistants (PDAs), smartphones, tablet PCs, MP3 players, laptop personal computers (laptop PCs), digital cameras, wearable devices, and the like, as well as mobile communication terminals.

One of these electronic devices may provide various complex functions. For example, one such electronic device may obtain information on an external object (for example, image information) using a camera module, and may provide various functions to the user by utilizing the same.

In another example, the user may share data of his or her daily lives with others through communication services such as social network services/sites (SNS), messenger services, and the like using the electronic device.

The above information is presented as background information only to assist with an understanding of the disclosure. No determination has been made, and no assertion is made, as to whether any of the above might be applicable as prior art with regard to the disclosure.

SUMMARY

An electronic device according to various embodiments may include: a camera module; a display; and a processor, wherein the processor may be configured to: obtain a preview image corresponding to an external object using the camera module; determine attributes of the external object, based on the obtained preview image; synthesize the preview image with a virtual character image, based on the attributes of the external object; and output the synthesized preview image through the display.

A method of outputting a virtual character image of an electronic device may include: obtaining a preview image corresponding to an external object using a camera module; determining attributes of the external object, based on the obtained preview image by a processor; synthesizing the preview image with a virtual character image, based on the attributes of the external object, by the processor; and outputting the synthesized preview image through a display.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

According to certain embodiments, the electronic device may obtain information about facial features or a facial expression of the user through a camera module, and may provide a virtual character image similar to facial features of the user or a virtual character image simulating a facial expression of the user, thereby attracting the user's interest in a social network service or a messenger service.

The electronic device may then utilize the virtual character images in various manners, as well as sharing the virtual character images including the simulated face or facial expressions with other users.

An electronic device according certain embodiments and an operation method thereof may provide various user experiences through various camera photographing functions to attract the user's interest.

An electronic device according certain embodiments and an operation method thereof may automatically propose, to the user, a specific photographing function suitable for a current photographing state, where the specific photographing function is selected among a plurality of photographing functions related to a virtual character image. The selection may be based on a preview image obtained through a camera module.

An electronic device according certain embodiments and an operation method thereof may provide efficient execution of functions by employing an optimal object tracking method suitable for a current photographing state when providing a virtual character image that is simulating the user.

Figure 1:
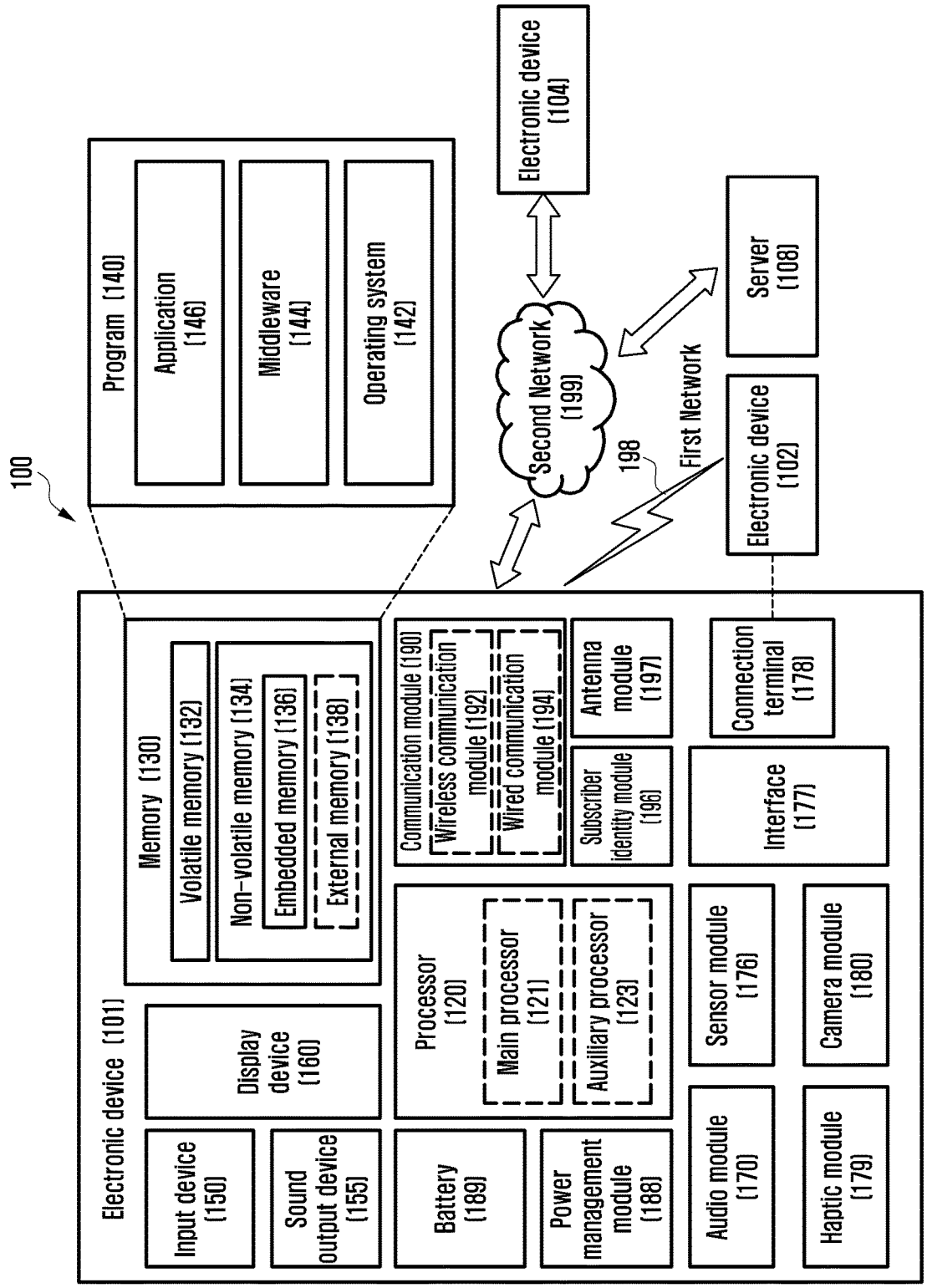
FIG. 1 is a block diagram of an electronic device 101 in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
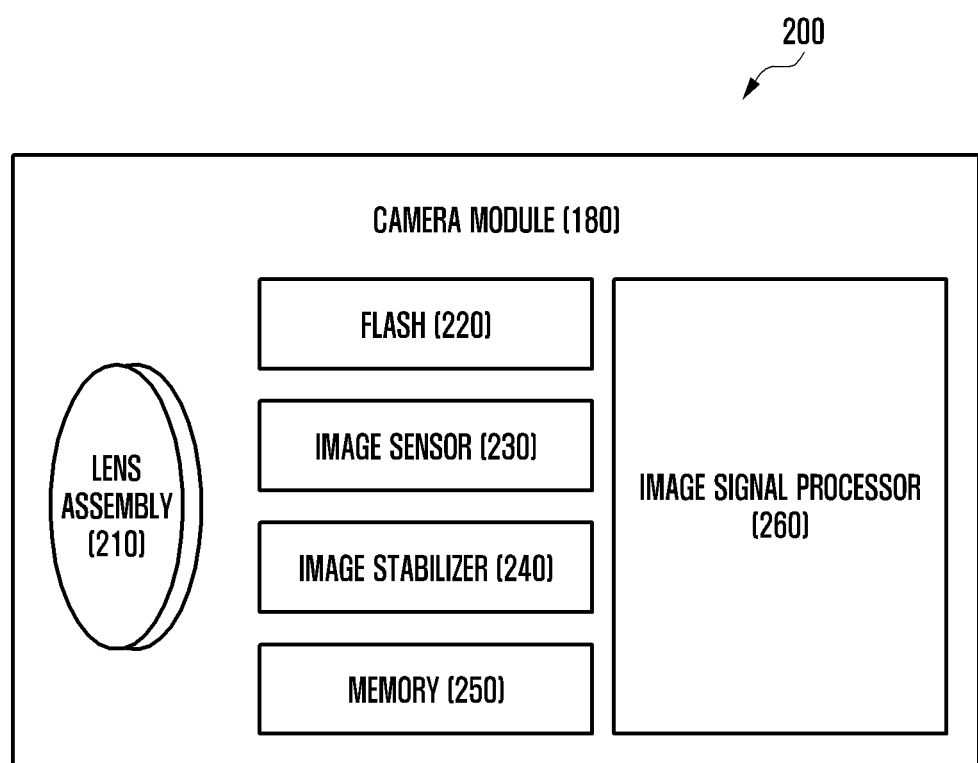
FIG. 2 is a block diagram 200 illustrating a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
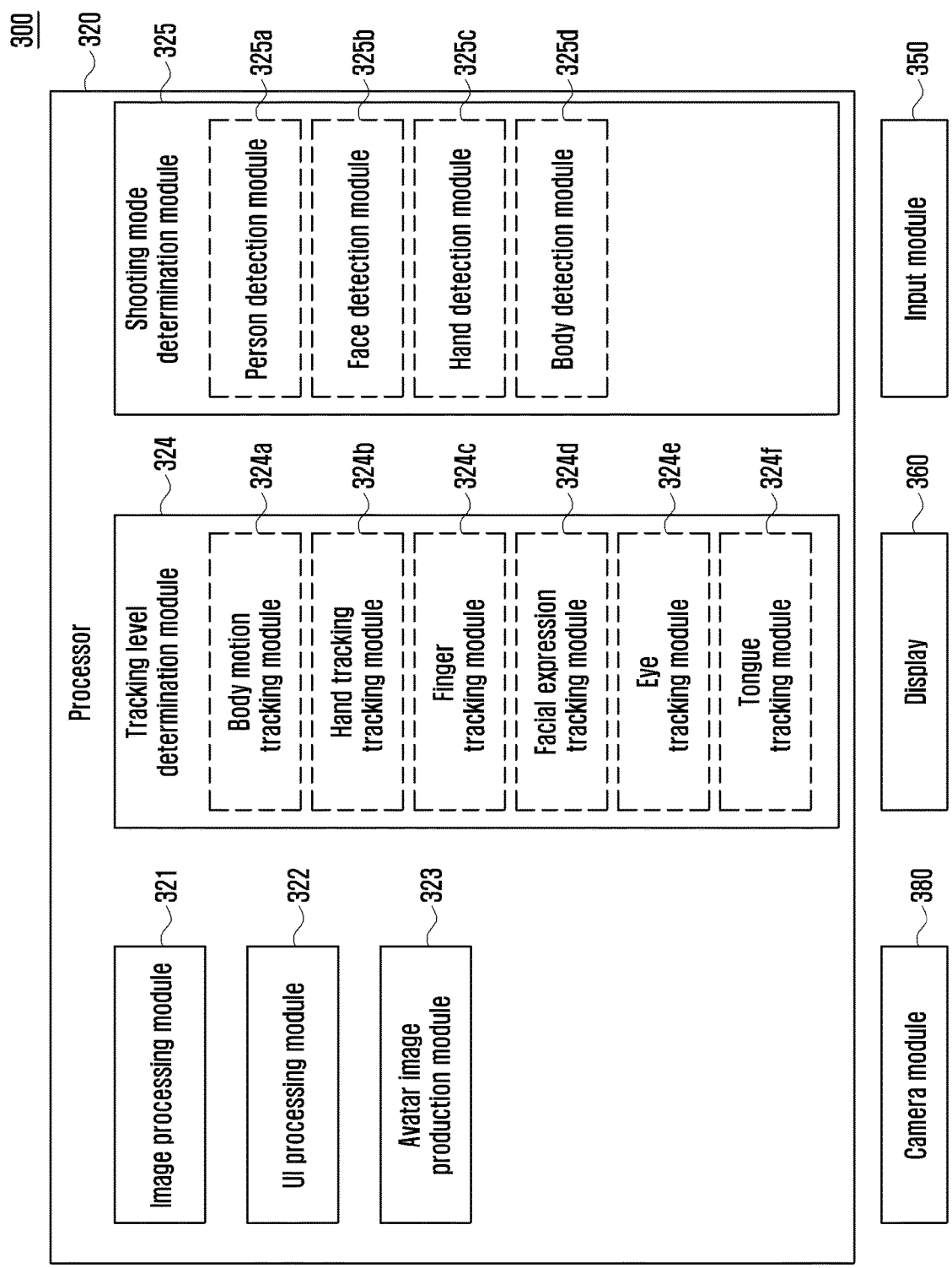
FIG. 3A is a block diagram illustrating the configuration of an electronic device according to an embodiment.

FIG. 3A is a block diagram illustrating the configuration of an electronic device according to an embodiment.

According to an embodiment, an electronic device 300 (e.g., the electronic device 101 in FIG. 1) may include a camera module 380 (e.g., the camera module 180 in FIG. 1), a display 360 (e.g., the display device 160 in FIG. 1), an input module 350 (e.g., the input device 150 in FIG. 1), and a processor 320 (e.g., the processor 120 in FIG. 1). The processor 320 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 320 may control the camera module 380 so as to obtain at least one image. For example, the camera module 380 may obtain a preview image corresponding to an external object. Further in this example, if an input for requesting photography is received from the user, or if a request for executing an application related to the camera module 380 is received from the user, the electronic device 300 may obtain a preview image through the camera module 380, and may output the preview image to the display 360. For example, the camera module 380 may output a preview image obtained in real time through the display 360, and may store the obtained image in a memory (e.g., the memory 130 in FIG. 1 or the memory 250 in FIG. 2) when the electronic device receives a user input for the execution of photography. In one example, the image stored in the memory may be a high resolution image corresponding to the output preview image.

Referring to FIG. 3A, the processor 320 according to an embodiment may include an image processing module 321, a user interface (UI) processing module 322, an avatar (e.g., a virtual character) image production module 323, a tracking level determination module 324, and a shooting mode determination module 325.

According to an embodiment, the image processing module 321 may include a variety of image processors (e.g., the image signal processors 260 in FIG. 2, a central processing unit, a graphic processor, or a digital processor) related to the camera module 380.

The image processing module 321 may perform functions to process the preview image obtained using the camera module 380 and output the same through the display 360. For example, the image processing module 321 may synthesize the preview image with a specified virtual character image (e.g., an avatar image), thereby producing a composite preview image to be output through the display 360.

The image processing module 321 according to an embodiment may analyze distinguishing features of a specific external object from the preview image obtained through the camera module 380 to determine attributes of the external object (e.g., the identity of the person, a face, etc.), and may detect an image area including the external object. For example, the image processing module 321 may detect a body area from the preview image, and may obtain information corresponding to face, eye(s), arm(s), leg(s), finger(s), facial expression, and/or tongue from the body area.

According to an embodiment, when the preview image obtained through the camera module 380 or the composite preview image that includes a virtual character image is output through the display 360, the user interface (UI) processing module 322 may output a user interface related to the output image together with the image. Accordingly, the electronic device 300 may receive specific user inputs through the input module 350 that are based on the user interface output on the display 360 by the user interface processing module 322. The electronic device 300 may then perform a function corresponding to the received user input.

For example, if execution of a function related to the virtual character (e.g., avatar) image is requested, the user interface processing module 322 may output a preview image through the display 360, and may output a user interface for receiving a user input related to the type of virtual character image together with the same on the output screen of the display 360. In this example, the user interface may allow the user to select between virtual reality (VR) and augmented reality (AR) modes. In the VR mode, the virtual character may be displayed on a generated virtual background image, while in the AR mode, the virtual character may be composited onto an actual live preview image.

As another example, the user interface processing module 322 may output a user interface for changing detailed image features of the virtual character displayed on the display 360.

According to an embodiment, the shooting mode determination module 325 may determine a shooting mode for obtaining a virtual character image, based on a preview image corresponding to the external object obtained using the camera module 380. The shooting mode determination module 325 according to an embodiment may include at least one of a person detection module 325*a* for detecting distinguished features corresponding to a person, a face detection module 325*b* for detecting distinguished features corresponding to the face of the person, a hand detection module 325*c* for detecting distinguished features corresponding to the hand of the person, and/or a body detection module 325*d* for detecting distinguished features corresponding to the body of the person.

The shooting mode determination module 325 according to an embodiment may determine attributes of an external object in the preview image. For example, the shooting mode determination module 325 may recognize at least one image area in an obtained image by applying an object recognition or object detection algorithm and/or a texture recognition algorithm. For example, the shooting mode determination module 325 may recognize at least one image area using various recognition algorithms, and may recognize at least one image area (e.g., face area, object area, or the like) using a recognition algorithm by applying machine learning or deep learning. The shooting mode determination module 325 may recognize whether or not the external object in the image includes person, face, hand, or body. As such, the shooting mode determination module 325 may recognize a specific image area from the preview image, and may extract distinguished features corresponding to the external object in the preview image, thereby determining the attributes of the external object corresponding to the distinguished features.

Figure 8:
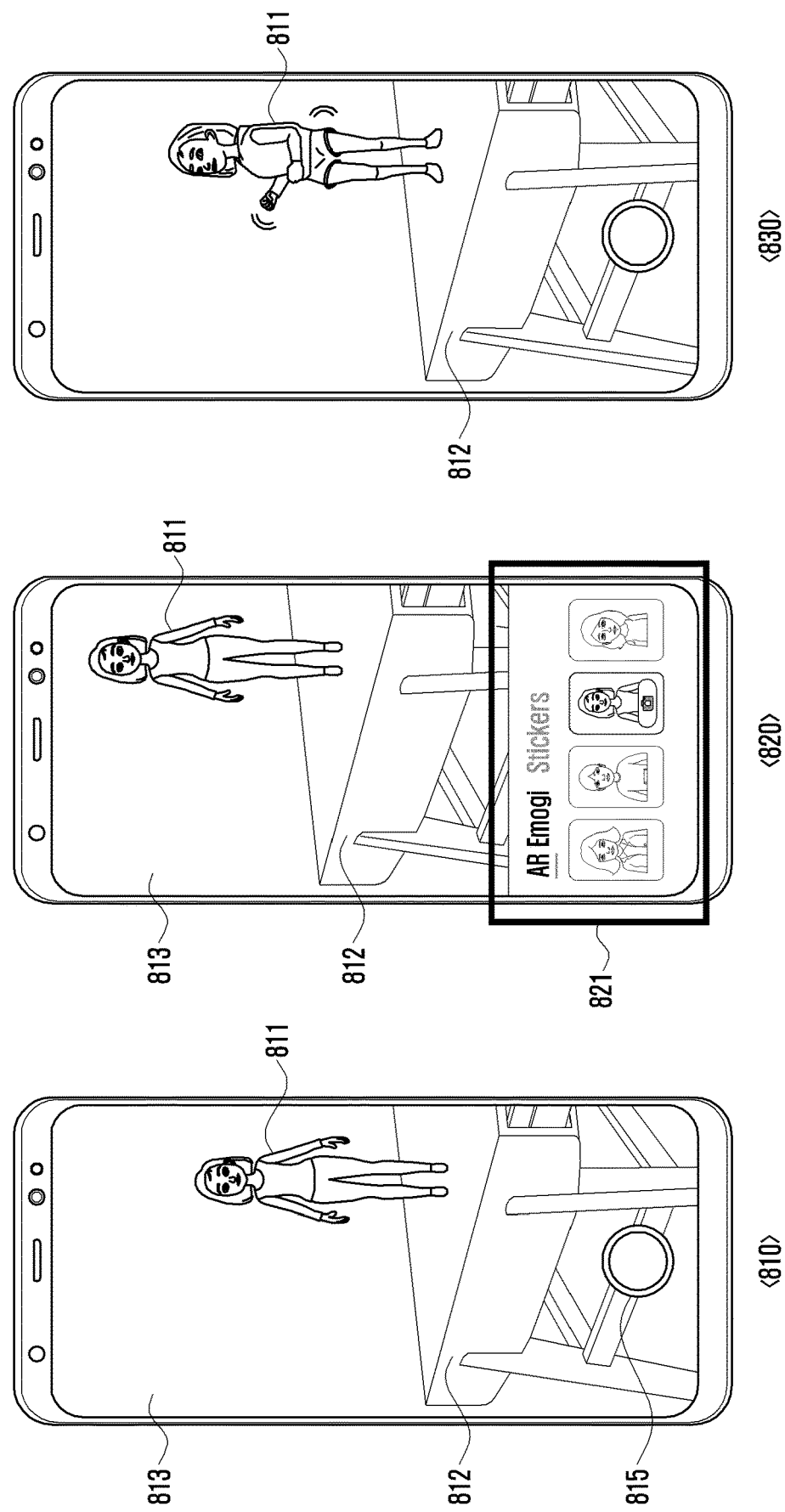
FIG. 8 is a diagram illustrating a user interface screen outputting a virtual character image in an electronic device according to an embodiment.

According to an embodiment, the shooting mode determination module 325 may determine whether or not the external object is a person, and may determine different shooting modes depending on whether or not the external object is a person. For example, the shooting mode determination module 325 may determine a first shooting mode (e.g., figurine mode), as shown in FIG. 8, if the external object is not a person. Again, the determination of whether the external object is a person may be based on the attributes of the external object. For example, the shooting mode determination module 325 may determine whether or not the extracted distinguished features correspond to a person, thereby determining whether or not the external object is a person. As another example, the shooting mode determination module 325 may determine whether or not the extracted distinguished features correspond to a face, and if the external object includes a face, may determine that the external object is a person. According to an embodiment, in the figurine mode, a specified virtual character image 811 is displayed in the image area corresponding to a plane area 812 included in the external object in the preview image.

Figure 5:
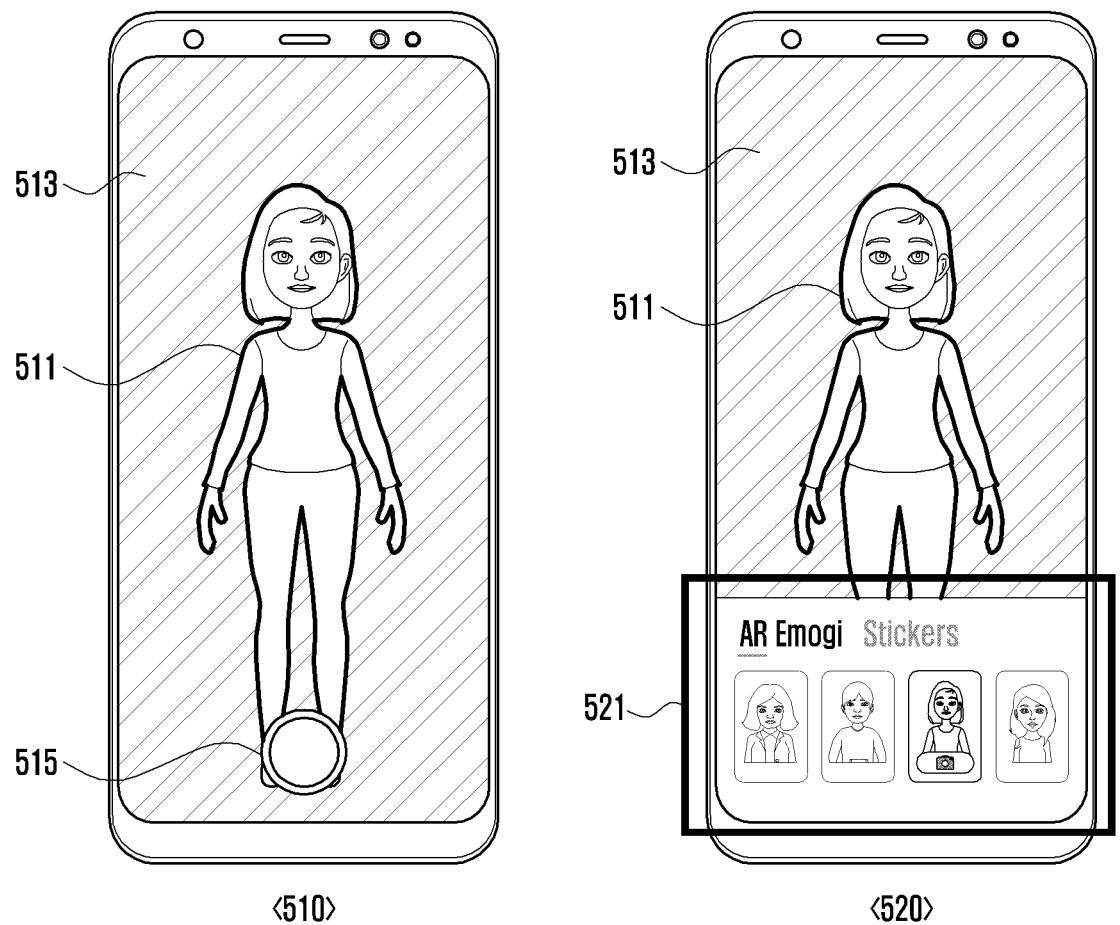
FIG. 5 is a diagram illustrating a user interface screen outputting a virtual character image in an electronic device according to an embodiment.
Figure 6:
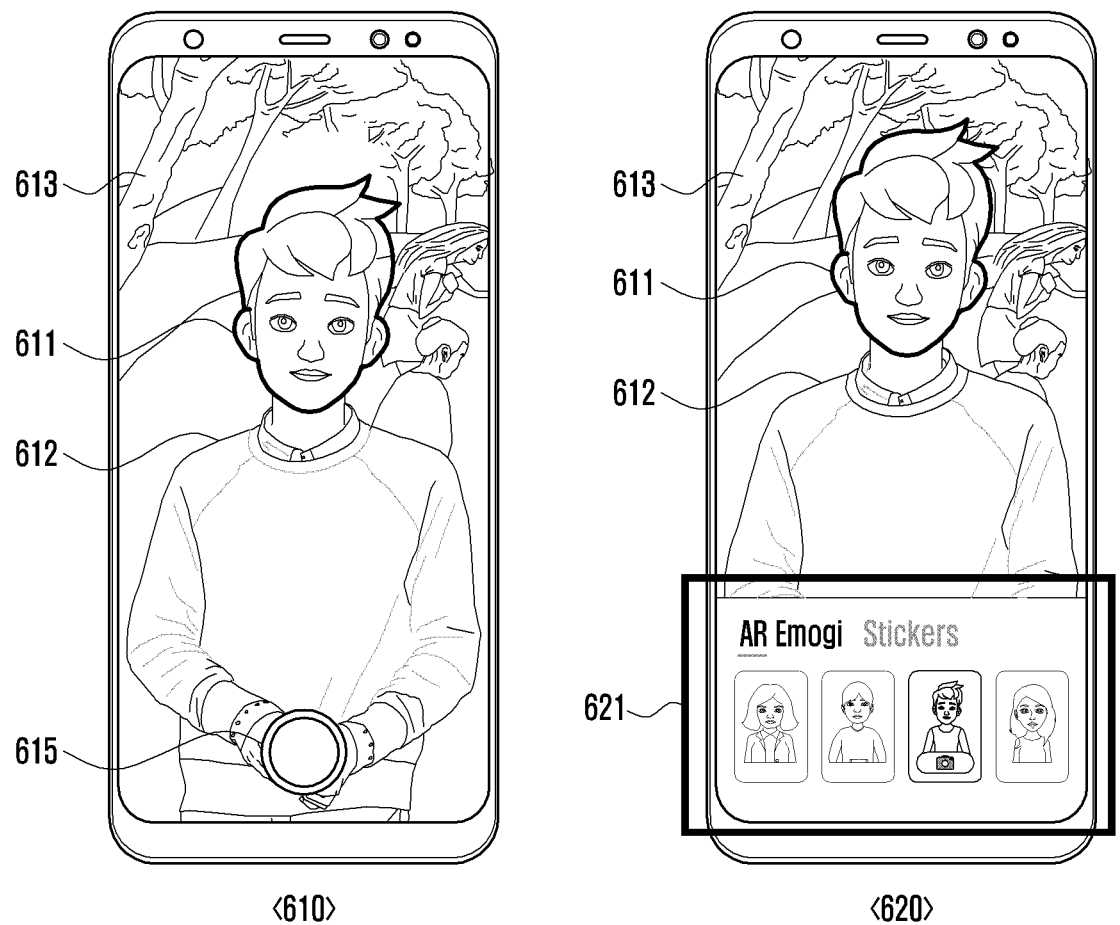
FIG. 6 is a diagram illustrating a user interface screen outputting a virtual character image in an electronic device according to an embodiment.
Figure 7:
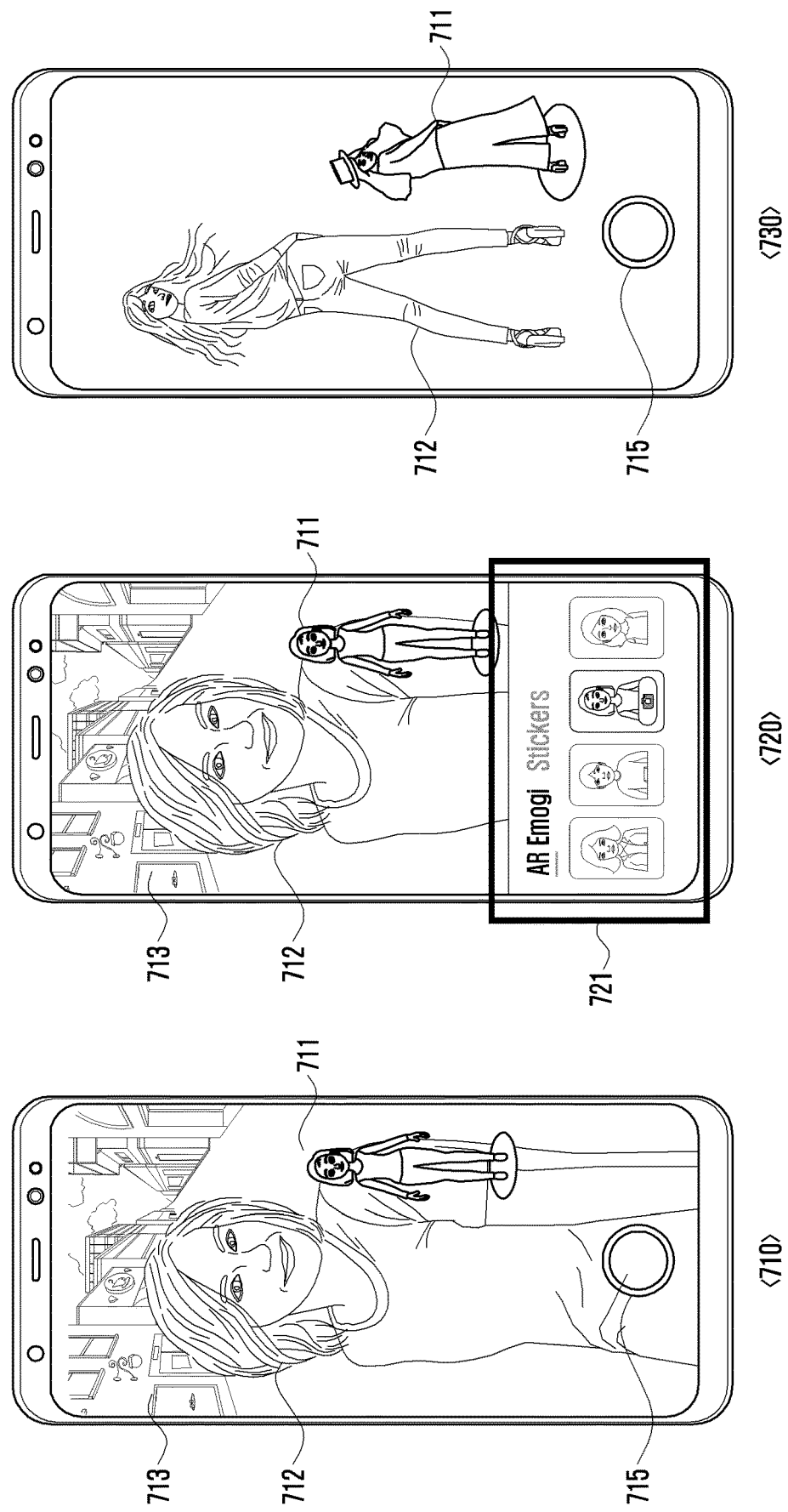
FIG. 7 is a diagram illustrating a user interface screen outputting a virtual character image in an electronic device according to an embodiment.

According to an embodiment, if the external object is a person, based on the attributes of the external object, the shooting mode determination module 325 may provide a second shooting mode for displaying a preview screen in which a virtual character image 511, 611, or 711 simulates the person's facial expression or motion, as shown in FIGS. 5 to 7. For example, the electronic device 300 may track distinguished features corresponding to the person, and may produce and display the virtual character image (e.g., an avatar image), based on the tracking information.

According to an embodiment, even in the case where an external object is recognized to be a person, the shooting mode determination module 325 may determine different shooting modes and provide different functions depending on whether or not the external object includes a face, a hand, a foot, or a whole body and/or depending on the size of an image area that includes the face, hand, foot, or body.

For example, it may be determined that a face area has a predetermined size or more or a predetermined ratio or more, based on the size of the image area corresponding to the face in the preview image. If so, the shooting mode determination module 325 may determine a 2-$1^{st}$ shooting mode (e.g., mask mode) as shown in FIG. 6. In this mode, the shooting mode determination module 325 may display a virtual character image 611 that replaces the face area of the preview image.

According to an embodiment, it may be determined that a body area has a predetermined size or more or a predetermined ratio or more, based on the size of the image area corresponding to the upper body or whole body of the person, for example, in the preview image. If so, the shooting mode determination module 325 may determine a 2-$2^{nd}$ shooting mode (e.g., virtual reality (VR) mode) as shown in FIG. 5. In this mode, the shooting mode determination module 325 may display a virtual character image 511 simulating features of the person (e.g., facial expression or motion of the user body) on a virtual background area 513.

According to an embodiment, it may be determined that a body area has a predetermined size or more or a predetermined ratio or more, based on the size of the image area corresponding to the upper body or whole body of the person, for example, in the preview image. If so, the shooting mode determination module 325 may determine a 2-$3^{rd}$ shooting mode (e.g., mini-me mode) as shown in FIG. 7. In this mode, the shooting mode determination module 325 may display a virtual character image 711 simulating features of the person (e.g., facial expression or motion of the user body) together with an image 712 of the person (i.e. the external object) on a background area 713 in the preview image. According to an embodiment, in the mini-me mode a virtual character image is synthesized with a preview image such that the background of the virtual character image 711 is the preview image.

According to an embodiment, it may be determined that the attributes of the external object corresponding to the preview image is changed. If so, the shooting mode determination module 325 may change the shooting mode in real time, or may change the shooting mode based on user input inputted through a user interface. For example, the shooting mode determination module 325 may determine that the external object is initially not a person, and provide the figurine mode as the shooting mode initially. The shooting mode determination module 325 may then continue to check whether or not the external object is a person in real time during the figurine mode. According to an embodiment, if a person is detected from the preview image while providing the figurine mode, the shooting mode determination module 325 may change the shooting mode to VR mode or mini-me mode. According to another embodiment, if the size of the face of the person as the external object is changed to a predetermined size or more while the shooting mode determination module 325 is operating in the VR mode or the mini-me mode, the shooting mode determination module 325 may change the shooting mode to the mask mode.

According to an embodiment, a tracking level determination module 324 may determine a level for tracking distinguished features corresponding to an external object from a preview image, based on the attributes of the external object.

According to an embodiment, in order to produce a virtual character (e.g., an avatar) which simulates the features of the external object in the preview image, the electronic device 300 may track feature changes of the external object in the preview image, and may produce a virtual character image (e.g., an avatar image) reflecting the same.

For example, the electronic device 300 may vary the level for tracking the feature changes of the external object, based on the attributes of the external object. For example, the electronic device 300 may more specifically track, or may roughly track, various distinguished features of the external object, based on the attributes of the external object.

According to an embodiment, the tracking level determination module 324 may determine the level for tracking the external object using at least one of a body motion tracking module 324*a* for tracking distinguished features corresponding to the body motion of a person, a hand tracking module 324*b* for tracking distinguished features corresponding to a hand, a finger tracking module 324*c* for tracking distinguished features corresponding to a finger, a facial expression tracking module 324*d* for tracking distinguished features corresponding to the eye, nose, and mouth of the face and/or the face contour, an eye tracking module 324*e* for tracking distinguished features corresponding to an eye or pupil (e.g., iris or user's gaze direction) and/or a tongue tracking module 324*f* for tracking distinguished features corresponding to a tongue. For example, the eye tracking module 324*e* may track the user's gaze, and the tongue tracking module 324*f* may track the tongue's motion (e.g., in the case where the user sticks out his/her tongue as a playful gesture or when pronouncing "th").

According to an embodiment, the tracking level determination module 324 may determine a tracking level according to the type of shooting mode determined by the shooting mode determination module 325 or based on user input. For example, the tracking level determination module 324 may determine to track the external object using the hand tracking module 324*b* and/or the finger tracking module 324*c* if it is determined that the external object includes a hand. As another example, if it is determined that the external object includes a face, the tracking level determination module 324 may track the external object using the facial expression tracking module 324*d*, the eye tracking module 324*e*, and/or the tongue tracking module 324*f*. As another example, if it is determined that an external object includes a body (e.g., whole body or upper body of a person), the tracking level determination module 324 may track the external object using the body motion tracking module 324*a*, the hand tracking module 324*b*, the finger tracking module 324*c*, the facial expression tracking module 324*d*, the eye tracking module 324*e*, and/or the tongue tracking module 324*f*.

According to an embodiment, the tracking level determination module 324 may determine a tracking level of the external object based on a distance between the external object photographed by the camera module 380 and the electronic device 300. According to an embodiment, the electronic device 300 may obtain information on the distance to the external object using a distance sensor or a depth sensor (e.g., a time-of-flight (ToF) sensor) included in the camera module 380, and may determine the tracking level, based on the obtained information. For example, if the external object is located close to the electronic device at a predetermined distance or less, the tracking level determination module 324 may configure the tracking level so as to track the external object more granularly. In doing so, all of the plurality of tracking modules 324*a*, 324*b*, 324*c*, 324*d*, 324*e*, and 324*f* may be used to track the various distinguished features. According to another embodiment, when there is no distance or depth sensor, the distance information with respect to the external object may be determined based on the size of an object (e.g., a face) in the image obtained through the camera module 380.

According to an embodiment, the tracking level determination module 324 may determine the size of an image area corresponding to the external object in the preview image, and may determine a tracking level of the external object, based on the size of the image area. For example, if it is determined that the size of the image area (e.g., a face area or a hand area) corresponding to the external object in the preview image exceeds a predetermined reference size, the tracking level determination module 324 may determine the tracking level so as to track the external object more granularly. For example, when the user generates a preview image by enlarging the face part of the user, the electronic device 300 may obtain more specific tracking information on the enlarged face part of the user, and may provide a virtual character image (e.g., an avatar image) that more precisely simulates the face of the user.

According to an embodiment, if it is determined that the distance to the external object (e.g., the user body) is greater than or equal to a predetermined reference distance or that the size of an image area corresponding to the external object is less than or equal to a reference size in the photographed preview image, the electronic device 300 may more roughly track the distinguished features of the external object using only the body motion tracking module 324a, instead of driving the module for specifically tracking an object, such as the facial expression tracking module 324d, the eye tracking module 324e, and/or the finger tracking module 324c, thereby minimizing unnecessary resource usage.

According to an embodiment, the tracking level determination module 324 may determine a tracking level based on a relative ratio between the size of the image area corresponding to the external object in a preview image and the size of the entire area of the preview image.

According to an embodiment, the avatar image production module 323 may extract distinguished features of the user's face from an image, and may reflect the extracted distinguished features in a pre-stored basic face model of a virtual character, thereby producing a virtual character similar to the user face.

According to an embodiment, the avatar image production module 323 may produce a first virtual character image performing a predetermined action using a pre-produced virtual character, and may store the same in a memory (e.g., the memory 130 or 250 in FIG. 1 or FIG. 2). For example, if it is determined that the external object is not a person in the preview image, the electronic device 300 may display, on the display 360, a user interface for compositing the first virtual character image with the preview image.

According to an embodiment, the avatar image production module 323 may track the distinguished features corresponding to the external object in a preview image, and may produce a second virtual character image, based on the tracking information obtained through the tracking. For example, the second virtual character image may include a motion in which a virtual character previously produced based on the preview image performs a similar motion as one performed by the external object.

According to an embodiment, the avatar image production module 323 may produce a virtual character image (i.e., avatar image) using a specific virtual character selected from among various types of virtual characters by the user.

An electronic device 300 according to an embodiment may include: a camera module (e.g., the camera module 380 in FIG. 3A); a display (e.g., the display 360 in FIG. 3A); and a processor (e.g., the processor 320 in FIG. 3A), wherein the processor may be configured to: obtain a preview image corresponding to an external object using the camera module; determine attributes of the external object, based on the obtained preview image; synthesize the preview image with a virtual character image, based on the attributes of the external object; and output the synthesized preview image through the display.

According to an embodiment, the processor may be configured to: track distinguished features of the external object in the obtained preview image, based on the attributes of the external object; produce the virtual character image, based on the distinguished features; synthesize the preview image with the produced virtual character image; and output the synthesized preview image through the display.

According to an embodiment, the processor may be configured to, when the external object is a person, based on the attributes of the external object, track distinguished features of the person, and produce the virtual character image based on the distinguished features of the person.

According to an embodiment, the processor may be configured to determine a tracking level with respect to the external object and track the distinguished features of the external object, based on the determined tracking level.

According to an embodiment, the tracking level may be determined based on a distance between the electronic device and the external object.

According to an embodiment, the tracking level may be determined based on a size of an imaging area corresponding to the external object in the preview image.

According to an embodiment, the tracked distinguished features may correspond to a face contour, a pupil, a mouth, a hand, a finger, and/or a body included in the external object.

According to an embodiment, the processor may be configured to synthesize the preview image with the virtual character image such that the virtual character image is displayed together with an image corresponding to the external object of the preview image in a background area of the preview image.

According to an embodiment, the processor may be configured to identify a face area of the external object in the preview image and synthesize the preview image with virtual character image such that at least a face portion of the virtual character image replaces the face area of the preview image.

According to an embodiment, the processor may be configured to, when the external object is not a person, based on the attributes of the external object, detect a plane area in the preview image and synthesize the preview image with virtual character image such that the virtual character image is displayed at a position corresponding to the plane area.

According to an embodiment, the processor may be configured to output a user interface for changing at least one aspect of the virtual character image (e.g., the virtual character image may be changed based on reception of a user input or non-reception of a user input for a predetermined time interval).

Figure 3B:
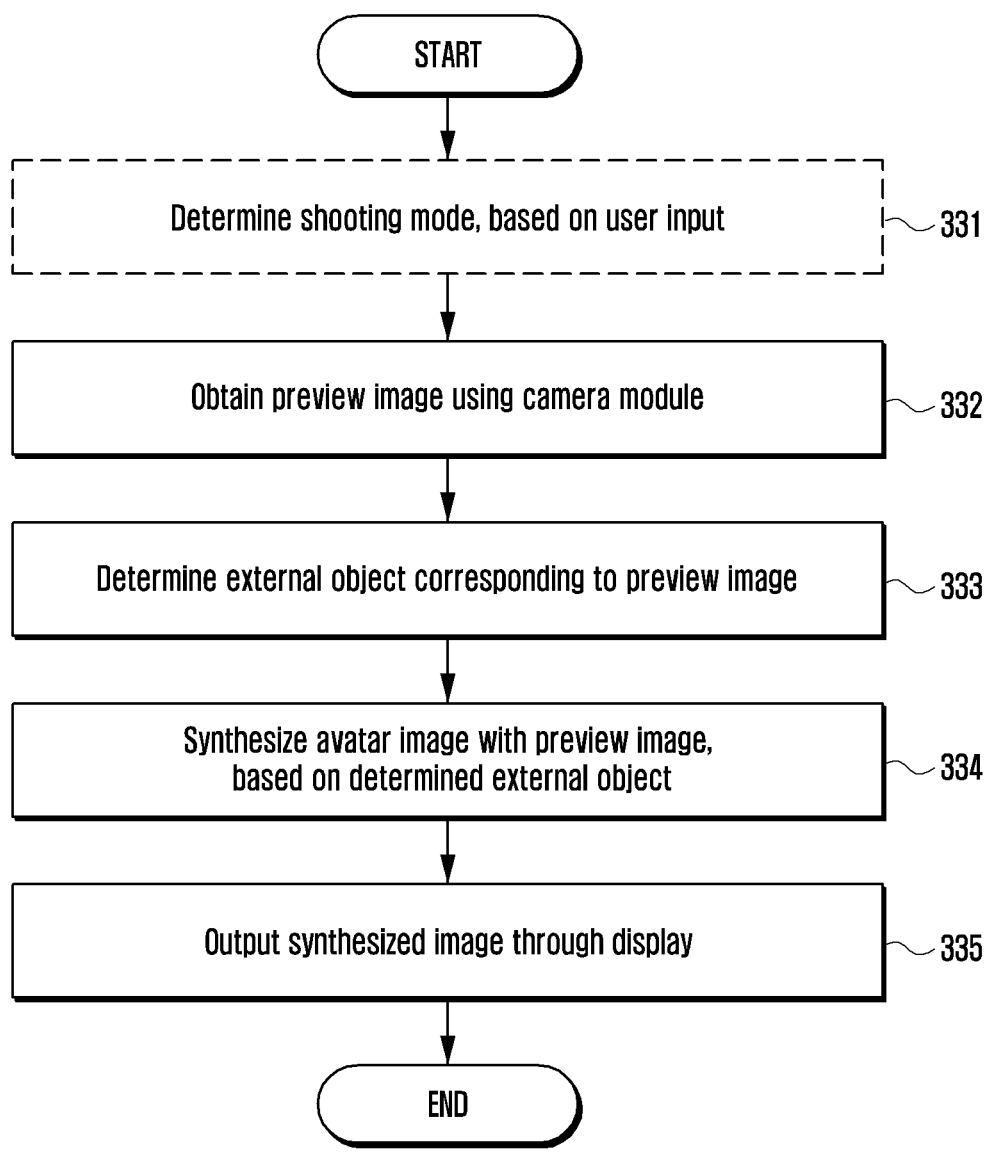
FIG. 3B is a flowchart illustrating a method of outputting an avatar image in an electronic device according to an embodiment.

FIG. 3B is a flowchart illustrating a method of outputting an avatar image in an electronic device according to an embodiment.

According to an embodiment, in operation 331, an electronic device 300 (or a processor 320 of the electronic device 300) may determine a shooting mode based on user input. For example, an electronic device 101 may receive, from the user, a user input regarding whether or not to perform photography of a virtual character or regarding a shooting mode for photography among a plurality of shooting modes utilizing a virtual character.

According to an embodiment, the electronic device 300 may identify the current state of the electronic device 101. If the current state corresponds to a predetermined condition, the electronic device 300 may automatically determine a shooting mode suitable for the current state, or may provide the user with a user interface for suggesting the suitable shooting mode, instead of performing operation 331.

For example, the electronic device 300 may perform an operation for producing a virtual character image if a user input to enter a shooting mode utilizing a virtual character is received or if a specific application related to a virtual character is executed while performing photography using the camera module 380.

According to an embodiment, the electronic device 300 may determine whether to perform photography in the VR mode or the AR mode, based on a user input from the user. For example, if in the VR mode, the electronic device 300 may display a virtual character image that simulates an external object on a virtual background screen. Alternatively, in the AR mode, the electronic device 300 may display a virtual character image that simulates an external object on a real background screen that is a preview image.

The electronic device 300 according to an embodiment may support a plurality of shooting modes in the AR mode. For example, the plurality of shooting modes may include the mask mode in which the external object (e.g., person) is displayed by replacing the face part (or the upper body) with a virtual character image, the mini-me mode in which the external object and a virtual character simulating the external object are displayed together, and/or the figurine mode in which a specified virtual character performs a specified action in a specific plane area included in the preview image. For example, the electronic device 300 may receive a user input for selecting one of the plurality of shooting modes using an input module 350, and may enter the corresponding shooting mode.

In operation 332, the electronic device 300 may obtain a preview image corresponding to the external object using a camera module 380. For example, the preview image may be obtained through the camera module 380 to then be output in real time through a display 360. The electronic device 300 may receive a user input while the preview image is displayed in real time through the display 360, thereby entering the shooting mode utilizing the virtual character.

In operation 333, the electronic device 300 may determine the external object in the preview image. For example, the electronic device 300 may determine the attributes of the external object based on the preview image. For example, the attributes of the external object may include at least one of whether or not or not the external object is a person, whether or not the external object includes a face, whether or not the external object includes a hand, whether or not the external object includes a plane area, and/or the distance between the external object and the electronic device.

In operation 334, the electronic device 300 may synthesize a preview image with a virtual character image (e.g., an avatar image) based on the determination on the external object.

For example, if it is determined that the external object is not a person, based on the attributes of the external object, the electronic device 300 may synthesize a preview image with a pre-produced virtual character image. As another example, the electronic device 300 may synthesize a virtual character image produced using a virtual character corresponding to the external object or a virtual character selected based on a user input with a preview image, based on the attributes of the external object.

In operation 335, the electronic device 300 may output the preview image synthesized in operation 334 through the display 360.

Figure 3C:
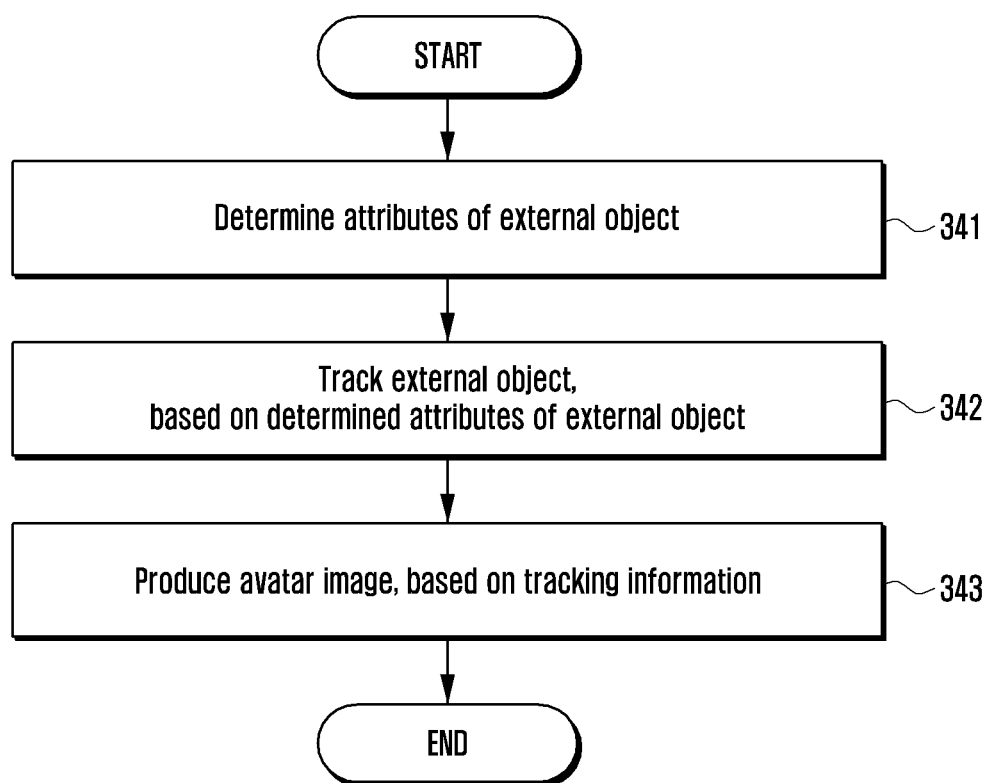
FIG. 3C is a flowchart illustrating a method of producing an avatar image (i.e., a virtual character image) according to an embodiment.

FIG. 3C is a flowchart illustrating a method of producing an avatar image (i.e., a virtual character image) according to an embodiment.

According to an embodiment, in operation 341, the electronic device 300 (or the processor 320 of the electronic device 300) may determine the attributes of the external object using the preview image.

In operation 342, the electronic device 300 may track the external object, based on the determined attributes of the external object. For example, if it is determined that the external object is a person, the electronic device 300 may track the motion of the external object using the preview image obtained in real time.

According to an embodiment, the electronic device 300 may track distinguished features of an image area of the external object, and may obtain tracking information based on the tracking. According to an embodiment, if the external object is not a person, based on the attributes of the external object, the electronic device 300 may output a screen indicating that there is no object to track, instead of tracking the external object.

In operation 343, the electronic device 300 may produce a virtual character image (i.e., an avatar image), based on the information obtained through tracking in operation 342. For example, the electronic device 300 may produce a virtual character image such that the virtual character simulates the motion of the external object using a pre-stored virtual character corresponding to the external object or a pre-stored virtual character selected based on a user input.

A method of outputting a virtual character image of an electronic device 300 according to an embodiment may include: obtaining a preview image corresponding to an external object using a camera module (e.g., the camera module 380 in FIG. 3A); determining attributes of the external object, based on the obtained preview image, by a processor (e.g., the processor 320 in FIG. 3A); synthesizing the preview image with a virtual character image, based on the attributes of the external object; and outputting the synthesized preview image through a display (e.g., the display 360 in FIG. 3A).

According to an embodiment, the synthesizing of the preview image with a specified virtual character image may include tracking distinguished features of the external object in the obtained preview image, based on the attributes of the external object, producing the virtual character image, based on the distinguished features, and synthesizing the preview image with the produced virtual character image, by the processor.

According to an embodiment, the method may include: when the external object is a person, based on the attributes of the external object, tracking distinguished features of the person; and producing the virtual character image based on the distinguished features of the person.

According to an embodiment, the method may include: determining a tracking level with respect to the external object; and tracking the distinguished features of the external object, based on the determined tracking level.

According to an embodiment, the tracking level may be determined based on a distance between the electronic device and the external object.

According to an embodiment, the tracking level may be determined based on a size of an imaging area corresponding to the external object in the preview image.

According to an embodiment, the tracked distinguished features may correspond to a face contour, a pupil, a mouth, a hand, a finger, and/or a body included in the external object.

According to an embodiment, the synthesizing of the preview image with the virtual character image may include synthesizing the preview image with the virtual character image such that the virtual character image is displayed together with an image corresponding to the external object of the preview image in a background area of the preview image.

According to an embodiment, the synthesizing of the preview image with the virtual character image may include identifying a face area of the external object from the preview image and synthesizing the preview image with virtual character image such that at least a face portion of the virtual character image replaces the face area of the preview image.

According to an embodiment, the synthesizing of the preview image with the virtual character image may include, when the external object is not a person, based on the attributes of the external object, detecting a plane area from the preview image and synthesizing the preview image with virtual character image such that the virtual character image is displayed at a position corresponding to the plane area.

According to an embodiment, the method may further include outputting a user interface for changing at least one aspect of the virtual character image (e.g., the virtual character image may be changed based on reception of a user input or non-reception of a user input for a predetermined time interval).

Figure 4:
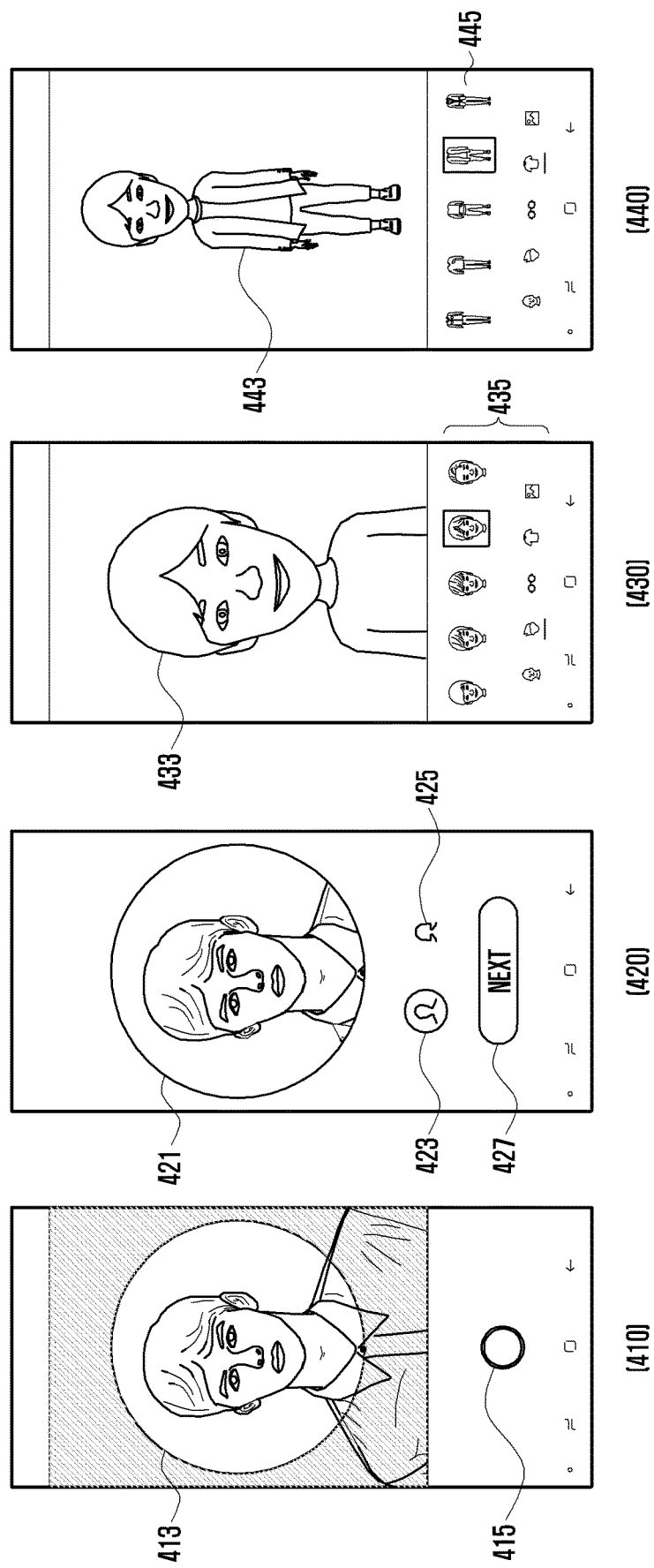
FIG. 4 is a diagram illustrating a user interface regarding production of a virtual character according to an embodiment.

FIG. 4 is a diagram illustrating a user interface regarding production of a virtual character according to an embodiment.

Referring to FIG. 4, an electronic device 300 (e.g., a processor 320 of the electronic device 300) according to an embodiment may output an image obtained through a camera module 380 to a display 360 as a preview image 413, as shown in screen example 410. For example, the electronic device 300 may obtain and store a user image 421 when it receives a user input to a shooting button 415.

The electronic device 300 may extract distinguished features of the user face in order to produce a virtual character from the obtained user image 421. For example, the electronic device 300 may produce a virtual character having features similar to the user face by reflecting the extracted distinguished features to a basic face model of the virtual character.

The electronic device 300 may determine whether or not to produce a male virtual character or a female virtual character using the obtained user image 421, based on a user input, as shown in screen example 420. For example, the electronic device 300 may output icons (e.g., a male icon 423, a female icon 425, and a confirmation icon 427) for receiving a user input regarding the gender. According to an embodiment, the electronic device 300 may determine the age, race, etc. of a virtual character, based on other user inputs.

The electronic device 300 may produce and output a virtual character 433 as shown in screen example 430, and may output selection items 435 for changing various attribute information of the virtual character 433 (e.g., the shape or size of eyes, the nose, the mouth, hair color, hair style, face type, and/or a skin color). For example, the electronic device 300 may determine the hair style of the virtual character 433, based on user input.

The electronic device 300 may receive selection for an item of the virtual character (e.g., selection for an item of clothing) from the user, thereby applying the same to the virtual character 443, as shown in screen example 440. For example, the electronic device 300 may output selection items 445 for selecting or changing an item, and may receive a user input.

According to an embodiment, the electronic device 300 may store information related to the produced virtual character in a memory (e.g., the memory 130 or 250 in FIG. 1 or FIG. 2), and may produce a virtual character image using the pre-stored virtual character information when entering a shooting mode utilizing the virtual character.

FIG. 5 is a diagram illustrating a user interface screen outputting a virtual character image in an electronic device according to an embodiment.

Screen example 510 may illustrate an example of a photographed screen in the VR mode in an electronic device 300 according to an embodiment. For example, upon receiving a user input to perform photography in the VR mode, the electronic device 300 may convert the preview image obtained using the camera module 380 into a virtual character image, and may display the same on the photographed screen in real time.

According to an embodiment, the electronic device 300 may produce a virtual character image 511, based on the preview image, in the VR mode, and may display the same on a virtual background 513. For example, the virtual character image 511 may simulate the motion of the external object, based on tracking information of the external object obtained using the preview image. According to an embodiment, in the case where the external object (e.g., a face) is photographed in proximity to the electronic device 300, the electronic device 300 may increase the tracking level for the external object to obtain more detailed tracking information and reflect the same to the virtual character image 511.

According to an embodiment, the user may store the virtual character image by pressing (e.g., touching) the shooting button 515.

The electronic device 300 may display an interface 521 for changing the type of virtual character as shown in screen example 520, and may produce and output the virtual character image in real time using the virtual character selected based on the user input.

FIG. 6 is a diagram illustrating a user interface screen outputting a virtual character image in an electronic device according to an embodiment.

Screen example 610 may show an example of a photographed screen in the mask mode in an electronic device 300 according to an embodiment.

Referring to FIG. 6, the electronic device 300 according to an embodiment may produce a virtual character image 611 in the mask mode, based on a preview image, and may synthesize the preview image with the produced virtual character image 611, thereby outputting the same to a screen. For example, the photographed screen in the mask mode may display an image area (e.g., a background 613 and a user body part 612) of the external object, except for a face part thereof, using an actual image obtained from the preview image, and may display the face part that is replaced with the virtual character image 611. Thus, the electronic device 300 may output an image in which only the face area in the preview image is replaced with the virtual character image simulating the face area in the mask mode.

According to an embodiment, the user may store the photographed image in the mask mode by pressing (e.g., touching) the shooting button 615 in screen example 610, and may select the type of character in the virtual character image output in the face area through an interface 621 for changing the type of virtual character in screen example 620.

FIG. 7 is a diagram illustrating a user interface screen outputting a virtual character image in an electronic device according to an embodiment.

According to an embodiment, FIG. 7 may show an example of a photographed screen in the mini-me mode supported by the electronic device 300 according to an embodiment.

According to an embodiment, the electronic device 300 may track an external object 712 of a preview image in the mini-me mode, and may output a virtual character image 711 produced based on the tracking together with a background 713 of the preview image and the external object 712. For example, the electronic device 300 may photograph both a virtual character 711 simulating the motion of the external object 712 and the external object 712 in the mini-me mode.

According to an embodiment, the user may store the photographed image in the mini-me using the shooting button 715 in screen example 710, and may select the type of virtual character that simulates the motion of the external object using an interface 721 for changing the type of virtual character in screen example 720.

As shown in screen example 730, the virtual character may simulate the motion of the external object, and may be displayed to be different from the external object in the hair style or costume item thereof, based on predetermined attributes of the virtual character.

FIG. 8 is a diagram illustrating a user interface screen outputting a virtual character image in a figurine mode in an electronic device according to an embodiment.

According to an embodiment, if it is determined that the external object in the preview image is not a person (or does not include a face), the electronic device 300 may perform photography in the figurine mode. For example, the electronic device 300 may detect a plane area 812 of the external object in the preview image, and may output a photographed screen displaying a specified virtual character image 811 at the position corresponding to the plane area 812.

According to an embodiment, the user may store the photographed image in the figurine mode using the shooting button 815 in screen example 810, and may select the type of virtual character that simulates the motion of the external object using an interface 821 for changing the type of virtual character in screen example 820.

According to an embodiment, based on reception of a predetermined user input on the photographed screen in which a virtual character image 811 is displayed or non-reception of a user input for a predetermined time interval in the figurine mode, the electronic device 300 may output a user interface for the virtual character image 811 to perform an action. For example, the electronic device 300 may output the virtual character 811 in which the virtual character 811 is dancing, as shown in screen example 830, if the user touches the touch screen in the figurine mode.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:
1. An electronic device comprising:
a camera;
a display;
a processor; and
memory storing instructions that, when executed by the processor, cause the electronic device to:
obtain, using the camera, a preview image including an object;
track the object in the obtained preview image;
determine whether or not the object includes a face of a user;
produce an avatar image including an avatar which has features corresponding to the user's face and/or which simulates a motion of the object based on the tracking of the object;
synthesize the avatar image with at least a portion of the object in the preview image;
output, through the display, the preview image such that the avatar image replaces the user's face in the preview image; and
select between providing a facial avatar and providing a body avatar according to whether a first portion or a second portion of a body of the user is a predetermined size relative to the object in the preview image.

2. The electronic device of claim 1, wherein the instructions, when executed by the processor, cause the electronic device to output a user interface for changing at least one aspect of the avatar image, and
wherein producing the avatar image includes selecting avatar features reflecting the features of the user face for inclusion in the avatar image, such that the produced avatar image resembles the user's face.

3. The electronic device of claim 2, wherein the instructions, when executed by the processor, cause the electronic device to:
output a plurality of selection items for changing various attribute information of the avatar; and
in response to detecting a selection of one of the selection items from among the plurality of selection items, modify a visual appearance of the avatar by incorporating a selected characteristic into the avatar.

4. The electronic device of claim 3, wherein the plurality of selection items includes sequential display of a first menu, a second menu and a third menu,
wherein the first menu including selectable items to indicate an applicable sex of the synthesized object, the second menu including selectable items representing applicable facial features of the synthesized object, and the third menu including selectable items to indicate applicable costume of the synthesized object.

5. The electronic device of claim 1, wherein the instructions, when executed by the processor, cause the electronic device to:
synthesize at least a portion of the object in the preview image with the avatar image such that the avatar image is displayed together with an image corresponding to the object of the preview image.

6. The electronic device of claim 5, wherein the instructions when executed by the processor, cause the electronic device to:
identify a face area of the object in the preview image; and
synthesize the object with the avatar image such that at least a face portion of the avatar image replaces the face area of the object.

7. The electronic device of claim 5, wherein the instructions, when executed by the processor, cause the electronic device to:
identify a whole area of the object in the preview image; and
synthesize the object with the avatar image such that a whole portion of the avatar image replaces the whole area of the object.

8. The electronic device of claim 1,
wherein providing the facial avatar is selected when the face is greater than the predetermined size and providing the facial avatar includes replacing the face within the object with a generated face of the avatar image, and
wherein providing the body avatar is selected when the upper body is greater than the predetermined size, and wherein providing the body avatar includes displaying a full body display of the avatar image with the upper body of the user within the object.

9. The electronic device of claim 1, wherein the instructions, when executed by the processor, cause the electronic device to:

track distinguished features of the object in the obtained preview image; and produce the avatar image based on the tracked distinguished features.

10. The electronic device of claim 9, wherein the tracked distinguished features correspond to a face contour, a pupil, a mouth, a hand, a finger, and/or a body included in the object.

11. The electronic device of claim 10, wherein the instructions, when executed by the processor, cause the electronic device to:

determine a tracking level with respect to the object; and track the distinguished features of the object based on the determined tracking level.

12. The electronic device of claim 11, wherein the tracking level is determined based on a distance between the electronic device and the object.

13. The electronic device of claim 11, wherein the tracking level is determined based on a size of an imaging area corresponding to the object in the preview image.

14. A method of outputting an avatar image of an electronic device, the method comprising:

obtaining, using a camera, a preview image including an object;

tracking the object in the obtained preview image;

determining whether or not the object includes a face of a user;

producing the avatar image including an avatar which has features corresponding to the user's face and/or which simulates a motion of the object based on the tracking of the object;

synthesizing the avatar image with at least a portion of the object in the preview image;

outputting, through a display, the preview image such that the avatar image replaces the user's face in the preview image; and select between providing a facial avatar and providing a full body avatar according to whether a first portion or a second portion of a body of the user is a predetermined size relative to the object in the preview image.

15. The method of claim 14, further comprising outputting a user interface for changing at least one aspect of the avatar image, and wherein producing the avatar image includes selecting avatar features reflecting the features of the user face for inclusion in the avatar image, such that the produced avatar image resembles the user's face.

16. The method of claim 15, further comprising:

outputting a plurality of selection items for changing various attribute information of the avatar; and in response to detecting a selection of one of the selection items from among the plurality of selection items, modifying a visual appearance of the avatar by incorporating a selected characteristic into avatar, wherein the plurality of selection items includes sequential display of a first menu, a second menu and a third menu, and wherein the first menu including selectable items to indicate an applicable sex of the synthesized object, the second menu including selectable items representing applicable facial features of the synthesized object, and the third menu including selectable items to indicate applicable costume of the synthesized object.

17. The method of claim 14, further comprising:

tracking distinguished features of the object in the obtained preview image; and producing the avatar image based on the distinguished features, wherein the tracked distinguished features correspond to a face contour, a pupil, a mouth, a hand, a finger, and/or a body included in the object.

18. The method of claim 14, wherein synthesizing of the object with the avatar image further comprises:

synthesizing at least a portion of the object in the preview image with the avatar image such that the avatar image is displayed together with an image corresponding to the object of the preview image.

19. The method of claim 14, wherein synthesizing of the object with the avatar image further comprises:

synthesizing the object with the avatar image such that at least a face portion of the avatar image replaces a face area of the object, or synthesizing the object with the avatar image such that a whole portion of the avatar image replaces a whole area of the object.

20. A non-transitory computer-readable recording medium storing a program which, when executed, causes an electronic device to perform operations comprising:

obtaining, using a camera, a preview image including an object;

tracking the object in the obtained preview image;

determining whether or not the object includes a face of a user;

producing the avatar image including an avatar which has features corresponding to the user's face and/or which simulates a motion of the object based on the tracking of the object;

synthesizing the avatar image with at least a portion of the object in the preview image;

outputting, through a display, the preview image such that the avatar image replaces the user's face in the preview image; and select between providing a facial avatar and providing a full body avatar according to whether a first portion or a second portion of a body of the user is a predetermined size relative to the object in the preview image.

* * * * *